United States Patent Office 3,016,393
Patented Jan. 9, 1962

3,016,393
SURFACE ACTIVE SULFONATED POLYESTERS
John D. Brandner and Ernest C. Ford, Jr., Wilmington, Del., assignors to Atlas Chemical Industries, Inc., a corporation of Delaware
No Drawing. Filed July 6, 1959, Ser. No. 824,937
7 Claims. (Cl. 260—400)

This invention relates to surface active compounds and to a process for making them. More particularly it relates to surface active compounds which are sulfonated glycol polyesters of mixed dicarboxylic and fatty acids.

The novel compounds, provided in accordance with the invention are mixed fatty acid-dicarboxylic acid polyesters of glycols wherein at least half of the dicarboxylic acid radicals, and at least one dicarboxylic acid radical per mol of polyester, carry a sulfonate group as substituent.

Referring now more particularly to the component radicals of the novel sulfonated polyesters, the glycol radical is that of an acyclic glycol containing from 2 to 6 carbon atoms which may be in a single hydrocarbon chain, straight or branched, or in a chain which is interrupted by oxygen. Thus the glycol radical may be furnished, for example, by ethylene glycol, diethylene glycol, triethylene glycol, 1,3-propylene glycol, 1,2-propylene glycol, dipropylene glycol, or any of the isomeric butylene glycols, pentylene glycols or hexylene glycols. Mixtures of such glycols, as well as the glycols individually, may be employed in the formation of compounds of the invention.

The fatty acid radicals of the novel sulfonated polyesters are those of acids containing from 12 to 18 carbon atoms. They may be saturated or unsaturated and may be employed singly or in admixture. Suitable fatty acid radicals are, for example, those of lauric acid, oleic acid, myristic acid, palmitic acid, stearic acid, and synthetic 12 to 18 carbon acids prepared by oxidizing aliphatic hydrocarbons in known manner. Mixtures of fatty acid radicals such as those of mixed fatty acids obtained by splitting naturally occurring fats and oils are likewise suitable for use in forming the compounds of the invention. Among such may be named the mixed fatty acid radicals of cottonseed oil acids, coconut oil acids, corn oil acids, peanut oil acids, tallow acids, and the like.

The dicarboxylic acid radicals, at least half of which carry a sulfonate group as substituent are those of aliphatic dicarboxylic acids containing from 4 to 10 carbon atoms. To exemplify unsubstituted dicarboxylic acid, the radicals of which may be found in the products of the invention, there may be named succinic, maleic, fumaric, adipic, sebacic, and itaconic acids. Exemplary sulfonated dicarboxylic acid radicals, suitable as component radicals of the surface active polyesters of the invention, are those of sulfosuccinic acid and sulfomethyl succinic acid.

The component radicals of the novel sulfonated polyesters of the invention are so proportioned that they are substantially complete esters, i.e., the hydroxyl and carboxyl radicals of the glycols and acids from which they are formed are in substantial stoichiometric balance. Moreover, they contain, per mol of polyester product, two molar proportions of fatty acid radical, from one to three molar proportions of dicarboxylic acid radical and from two to four molar proportions of glycol radical. At least half of the said dicarboxylic acid radicals carry a sulfonate group as substituent therein, and the number of such sulfonate-substituted dicarboxylic acid radicals is sufficient to furnish at least one sulfonate group per mol of complete polyester.

The composition and structure of compounds in accordance with the invention will be more readily understood from a general description of one suitable method of preparing a typical member thereof. Two molar proportions of ethylene glycol and one molar proportion of maleic anhydride are reacted under esterifying conditions to form the di(glycol) ester which has the formula

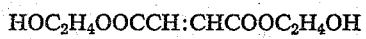

HOC$_2$H$_4$OOCCH:CHCOOC$_2$H$_4$OH

This dihydroxy ester is then esterified with two molar proportions of a fatty acid of formula RCOOH to yield a mixed ester of the following formula

RCOOC$_2$H$_4$OOCCH:CHCOOC$_2$H$_4$OOCR

The unsaturated acid radical of the mixed polyester is then converted to a sulfosuccinate radical by treating the mixed polyester with an aqueous bisulfite solution in known manner. The resulting product is substantially completely esterified and comprises, per mol of complete ester, two mols of a fatty acid radical, one mol of a dicarboxylic acid radical containing a sulfonate group as substituent, and 2 mols of glycol radical, thus conforming to the foregoing definition.

By starting with two mols of maleic acid and 3 mols of glycol in the first stage of the foregoing reaction and reacting with two molar proportions of fatty acid a product of the following formula (writing R, M and G for the fatty, maleic, and glycol radicals, respectively) is obtained

R—G—M—G—M—G—R

Sulfonation of either or both of the maleic residues yields a compound in accordance with the invention.

It is not necessary, in preparing the mixed polyesters to be sulfonated as described above, that the esterification be carried out in stepwise fashion. Fatty acid, dibasic acid and glycol in the indicated proportions may be admixed and subjected to esterification conditions until esterification is substantially complete. The resulting product will have a composition as indicated above.

It is to be noted that sulfonation of the unsaturated dibasic acid removes the unsaturation and, if sulfonation is complete, no unsaturation remains in the

—G—M—G—M— portion of the compound. Variations on the general process described above may be employed to obtain controlled proportioning of sulfonate substituted, saturated (but unsubstituted) and unsaturated dicarboxylic acid radicals in the compounds of the invention. Thus for example, a mixture of a sulfosuccinic acid and a saturated unsubstituted dicarboxylic acid may be employed to yield a final product in which only part of the dibasic acid radicals are sulfonated. By employing as the carboxylic acid a mixture of sulfosuccinic acid and maleic or fumaric acid a final product is obtained which may be crosslinked with vinyl compounds to high molecular weight sulfonate substituted, oil modified polyesters.

Conventional esterification techniques may be employed in preparing the surface active ester products of the invention from glycols and acids furnishing the radicals characterized in detail hereinbefore. Thus direct, high temperature esterification of the glycol and the acids under water removing conditions may be resorted to. Instead of the free acid, anhydrides of those acids which readily form anhydrides may be employed. Or, if desired, lower alkyl esters of the acids, such as the methyl or ethyl ester may be employed to furnish the acid radicals, in which case the volatile component to be removed is alcohol instead of water.

Another well-known esterification technique, applicable to preparing the polyester compounds of the invention, is to carry out the reaction in the presence of boiling xylene or other water immiscible liquid which forms an azeotrope with water, condensing the vapors distilling from the reaction mixture, mechanically separating the water layer from the condensate and returning the xylene layer to the reaction vessel.

Conventional esterification catalysts, such, for example, as toluene sulfonic acid, may be utilized in known manner to hasten the reaction or permit its being carried out at lower temperatures to minimize darkening of the product.

If desired, when esterifying an unsaturated dibasic acid which is susceptible to double bond polymerizing reactions at elevated temperatures, a vinyl polymerization inhibitor such, for example, as hydroquinone may be introduced into the reacting mixture.

The following illustrative examples describe in detail the preparation of representative compounds coming within the scope of the invention.

Example I 196 g. (2 mols) maleic anhydride, 424 g. (4 mols) diethylene glycol and 0.8 g. hydroquinone were charged to a 3 necked 2-l. flask equipped with stirrer, thermometer and $CO_2$ inlet tube. The charge was blanketed with $CO_2$ (100 cc./m.) and temperature raised to 180° C. in 20 minutes. After 4 hr. reaction at 180–185° C., an acid number of 34 was obtained. 1128 g. (4 mols) oleic acid (Emersol 233LL) were added and reaction temperature of 180–185° C. regained in 30 minutes. The reaction was continued for an additional 9½ hours at which time an acid number of 24 was obtained. The reaction was then terminated by cooling the mass to room temperature. The resulting product was a yellow slightly viscous liquid.

956 g. of the above ester were placed in a 3 necked 2-l. flask equipped with agitator thermometer and $CO_2$ inlet tube. 300 g. distilled water and 129 g. sodium bisulfite were added for the sulfonation step. The mass was heated to 85° C. and held for a period of 2 hours at which time vacuum was applied and the water removed. The final product at room temperature was a brown, opaque liquid which was soluble in perchloroethylene, Stoddard solvent, xylol and toluol.

Example II 294 g. (3 mols) maleic anhydride, 424 g. (4 mols) diethylene glycol, 0.8 g. hydroquinone and 0.8 g. p-toluene sulfonic acid were charged to a 3 necked 2-l. flask equipped with stirrer, thermometer and $CO_2$ inlet tube. The charge was blanketed with $CO_2$ (100 cc./m.) and temperature raised to 180° C. in 1 hour. At the end of 1 hour the temperature was raised to 195° C. and held for 5 hours at which time an acid number of 27 was obtained. 564 g. oleic acid (Emersol 233LL) were added and reaction temperature of 195° C. regained in 30 minutes. The reaction was continued for an additional 11 hours at which time an acid number of 27 was obtained. The reaction was then terminated by cooling the mass to room temperature.

1132 g. of the above ester were placed in a 3 necked 3-l. flask equipped with thermometer, $CO_2$ inlet tube, agitator, invert water trap and water cooled condenser. 200 g. distilled water, 315 g. sodium bisulfite and 1000 g. perchloroethylene were added for the sulfonation step. The mass was heated to 95° C. at which point water removal started. By azeotropic distillation the water was removed in 4 hours. The final product was a brown, opaque, extremely viscous liquid at room temperature.

Example III 196 g. (2 mols) of maleic anhydride, 318 g. (3 mols) diethylene glycol and 578 g. (2 mols) of a fatty acid rich in oleic acid recovered from tall oil (Acintol #2) were charged to a 3 necked 2-l. flask equipped with stirrer, thermometer, $CO_2$ inlet tube, Barrett receiver and water cooled condenser. 100 cc. xylol were added and $CO_2$ (100 cc./m.) blanket applied. The temperature was then raised until xylol refluxing began (155° C.) at which time the $CO_2$ blanket was discontinued. The temperature of the mass increased to 180° C. over a 2 hour period, water of esterification being drawn off as formed. After 5 hours reaction at 180–185° C. the reaction was essentially complete and the resulting product, a yellow moderately viscous liquid, analyzed AN 29.

714 g. of the above ester (solids basis) were placed in a 3 necked 2-l. flask equipped with thermometer, $CO_2$ inlet tube, Barrett receiver and water cooled condenser. 200 g. distilled water and 154 g. sodium bisulfite were added for the sulfonation step. Sufficient xylol was then added so that on completion of azeotropic water removal a product 70% solids in xylol was obtained. This required approximately 3 hours. Temperature of the mass was 99° C. at start of the refluxing period and rose to 146° C. at end. The final product after filtration to remove unreacted sodium bisulfite was an amber colored, slightly viscous liquid.

Example IV 196 g. (2 mols) maleic anhydride, 228 g. (3 mols) propylene glycol and 578 g. (2.0 mols) Acintol #2 fatty acids were charged to a 3 necked 2-l. flask equipped with stirrer, thermometer and $CO_2$ inlet tube. The charge was blanketed with $CO_2$ (100 cc./m.) and temperature raised to 165° C. in 1 hour. After 2 hours reaction at 165–170° C. the temperature was raised to 180° C. At the end of 12 hours at 180–185° C., an acid number of 26 was obtained. The reaction was then terminated by cooling the mass to room temperature. The resulting product was a yellow, moderately viscous liquid.

500 g. of the above ester were placed in a 3 necked 2-l. flask equipped with thermometer, $CO_2$ inlet tube, agitator, Barrett receiver and water cooled condenser. 200 g. distilled water, 118 g. sodium bisulfite and 265 g. xylol were added for the sulfonation step. The mass was heated to 95° C. at which point the $CO_2$ blanket was discontinued and azeotropic removal of water began. After 3 hours refluxing water was removed. The final product, 70% solids in xylol was light colored and viscous at room temperature.

Example V 118 g. (1.2 mols) maleic anhydride, 117 g. (0.8 mol) adipic acid, 318 g. (3.0 mols) diethylene glycol and 578 g. (2.0 mols) Acintol #2 fatty acids were charged to a 3 necked 2-l. flask equipped with stirrer, thermometer and $CO_2$ inlet tube. The charge was blanketed with $CO_2$ (100 cc./m.) and temperature raised to 180° C. in 1 hour. After 17 hours reaction at 180–185° C. an acid number of 28 was obtained. The reaction was then terminated by cooling the mass to room temperature. The resulting product was a yellow, moderately viscous liquid.

500 g. of the above ester were placed in a 3 necked 2-l. flask equipped with thermometer, $CO_2$ inlet tube, agitator, Barrett receiver and water cooled condenser. 200 g. distilled water, 56 g. sodium bisulfite and 328 g. xylol were added for the sulfonation step. The mass was heated to 95° C. at which point the $CO_2$ blanket was discontinued and azeotropic removal of water began. After 3 hours refluxing water was removed. The final product 70% solids in xylol was light colored and fairly viscous at room temperature.

Example VI 196 g. (2.0 mols) maleic anhydride, 318 g. (3.0 mols) diethylene glycol and 568 g. (2.0 mols) stearic acid (Hystrene S–97) were charged to a 3 necked 2-l. flask equipped with stirrer, thermometer and $CO_2$ inlet tube. The charge was blanketed with $CO_2$ (100 cc./m.) and temperature raised to 180° C. in 1 hour. After 15 hours reaction at 180–185° C. an acid number of 25 was obtained. The reaction was then terminated by cooling the mass to room temperature. The resulting product was a light colored, opaque solid.

500 g. of the above ester were placed in a 3 necked 2-l. flask equipped with thermometer, $CO_2$ inlet tube, agitator, Barrett receiver and water cooled condenser. 200 g. distilled water, 109 g. sodium bisulfite and 261 g. xylol were added for the sulfonation step. The mass was heated to 95° C. at which point the $CO_2$ blanket was discontinued and azeotropic removal of water began. After 3 hours refluxing, water was removed. The final product 70% in xylol was light colored and of a gel-like consistency at room temperature.

*Example VII*

196 g. (2.0 mols) maleic anhydride, 318 g. (3.0 mols) diethylene glycol and 400 g. (2.0 mols) lauric acid were charged to a 3 necked 2-l. flask equipped with stirrer, thermometer and $CO_2$ inlet tube. The charge was blanketed with $CO_2$ (100 cc./m.) and temperature raised to 180° C. in one hour. After 15 hours reaction at 180-185° C. an acid number of 38 was obtained. The reaction was then terminated by cooling the mass to room temperature. The resulting product was a light yellow, moderately viscous liquid.

500 g. of the above ester were placed in a 3 necked 2-l. flask equipped with thermometer, $CO_2$ inlet tube, agitator, Barrett receiver and water cooled condenser. 200 g. distilled water, 130 g. sodium bisulfite and 270 g. xylol were added for the sulfonation step. The mass was heated to 95° C. at which point the $CO_2$ blanket was discontinued and azeotropic removal of water begun. After 4 hours refluxing, water was removed. The final product 70% in xylol was light colored and of a gel-like consistency at room temperature.

*Example VIII*

260 g. (2.0 mols) itaconic acid, 318 g. (3.0 mols) diethylene glycol and 578 g. (2.0 mols) Acintol #2 fatty acids were charged to a 3 necked 2-l. flask equipped with stirrer, thermometer and $CO_2$ inlet tube. The charge was blanketed with $CO_2$ (100 cc./m.) and temperature raised to 180° C. in 1 hour. After 15 hours reaction at 180-185° C. an acid number of 44 was obtained. The reaction was then terminated by cooling the mass to room temperature. The resulting product was yellow, moderately viscous liquid.

500 g. of the above ester were placed in a 3-necked 2-l. flask equipped with thermometer, $CO_2$ inlet tube, agitator, Barrett receiver and water cooled condenser. 200 g. distilled water, 105 g. sodium bisulfite and 259 g. xylol were added for the sulfonation step. The mass was heated to 95° C. at which point the $CO_2$ blanket was discontinued and the azeotropic removal of water begun. After 4 hours refluxing, water was removed. The final product 70% in xylol was dark and viscous at room temperature.

*Example IX*

196 g. (2 mols) maleic anhydride and 318 g. (3 mols) diethylene glycol were charged to a 3 necked 2-l. flask equipped with stirrer, thermometer and $CO_2$ inlet tube. The charge was blanketed with $CO_2$ (100 cc./m.) and temperature raised to 180° C. in 1 hour. After 4 hours reaction at 180-185° C., an acid number of 40 was obtained. 578 g. (2 mols) of Acintol #2 fatty acid were added and reaction temperature of 180-185° C. regained in 20 minutes. The reaction was continued for an additional 8½ hours at which time an acid number of 26 was obtained. The reaction was then terminated by cooling the mass to room temperature. The resulting product was a yellow moderately viscous liquid.

714 g. of the above ester were placed in a 3 necked 2-l. flask equipped with thermometer, $CO_2$ inlet tube, Barrett receiver and water cooled condenser. 200 g. distilled water and 154 g. sodium bisulfite were added for the sulfonation step. Sufficient xylol was then added (372 g.) so that after the azeotropic distillation of water was complete a product 70% solids in xylol was obtained. This required approximately 3 hours. Temperature of the mass was 99° C. at start of the refluxing period and rose to 144° C. at end. The final product after filtration to remove unreacted sodium bisulfite was an amber colored, slightly viscous liquid.

In the foregoing examples, the sulfonating agent employed in each case was aqueous sodium bisulfite solution. It is to be understood that bisulfites of other monovalent cations, particularly those of the other alkali metals and ammonium, may equally well be employed. The use of such bisulfite leads to the formation of the corresponding alkali metal or ammonium salt of the polyester sulfonate. Also within the purview of the invention are polyvalent metal salts of the sulfonated polyesters described above, which may readily be prepared by simple metathesis of one of the alkali metal salts formed as described above with a soluble salt of a polyvalent metal hydroxide to precipitate the corresponding polyvalent metal sulfonate. Such procedure is well known in the chemical art and requires no further elaboration.

The products of the invention are surface active agents, characterized by their ability to greatly lower the surface tension of water at extremely high dilutions. Thus a product made in accordance with Example IX, at a concentration of 5 parts per million in water, produced a solution with a surface tension of only 35 dynes. They may be employed as wetting and emulsifying agents in the textile processing industry and in the field of agricultural insecticides. They may be used as heavy duty detergents as for example in the cleaning of greased metal parts. They have shown particular utility as detergents in the dry cleaning art. By way of illustration representative members of the foregoing examples were tested in comparison with a commercially employed petroleum sulfonate (Petronate L) in the dry cleaning of rayon fabric with respect to units of soil removed and percent of soil redeposited. The tests were conducted as follows:

400 ml. of a 1% solution (prepared on an active basis) of each test material in perchloro-ethylene (wgt./vol.) were prepared and placed in beakers in the Terg-O-Tometer.[1] Into each beaker were placed two soiled swatches and two unsoiled swatches (4" x 4") of Spun Viscose Soil Test Cloth (Spec. 51547 Bu. Ships—Testfabrics) that had been chosen at random and their reflectances measured using the Hunter Reflectometer with green filter. These swatches were washed for 30 minutes at 75° F. with speed of 60 r.p.m. At the end of the wash period, the swatches were removed and placed on paper towels to dry at room temperature. Upon drying, the reflectances of the swatches were again measured. The reflectance readings were used in determining the units of soil removal and the percent of soil redeposited according to the following formulas:

Percent soil redeposited:

$$\frac{\text{Units of soil redeposited}}{\text{Units of soil removed}} \times 100$$

Units of soil removed relative to Petronate L as 100:

$$\frac{\text{Units of soil removed by test material}}{\text{Units of soil removed by Petronate L}} \times 100$$

Units of soil redeposited=original reflectance unsoiled swatch—washed reflectance unsoiled swatch ×100 (ΔR×100)

Units of soil removed=washed reflectance soiled swatch—original reflectance soiled swatch×100 (ΔR×100)

---

[1] Terg-O-Tometer is the trade name of an apparatus widely used in the evaluation of detergents and is described, for example, in the book Evaluation and Testing of Detergents by Jay C. Harris, published 1954 by Interscience Publishers Corporation, New York.

The results obtained were as follows:

| Test Material | Soil Removal (Petrol. Sulf. 100) | Soil Redeposit Percent |
|---|---|---|
| Petrol. Sulfonate | 100 | 11.3 |
| Prod. of Ex. III | 349 | 2.2 |
| Prod. of Ex. V | 307 | 7.1 |
| Prod. of Ex. VII | 309 | 9.2 |
| Prod. of Ex. VIII | 293 | 2.6 |

The foregoing examples are presented for illustrative purposes and are not to be interpreted as limiting the scope of the invention.

What is claimed is:

1. A substantially complete ester of an acyclic glycol containing from 2 to 6 carbon atoms and selected from the group consisting of alkylene and polyalkylene glycols, an aliphatic dicarboxylic acid containing from 4 to 10 carbon atoms and selected from the group consisting of saturated and ethylenically unsaturated acids, and a fatty acid containing from 12 to 18 carbon atoms, containing, per mol of complete ester, two mols of fatty acid radical, from one to three mols of dicarboxylic acid radical, and from two to four mols of glycol radical, wherein sufficient of the said dicarboxylic acid radicals contain a sulfonate group as substituent to furnish at least one sulfonate group per mol of said complete ester as well as at least one sulfonate group for each two dicarboxylic acid radicals.

2. A substantially complete ester of diethylene glycol, a sulfosuccinic acid, and a fatty acid containing from 12 to 18 carbon atoms, containing, per mol of complete ester, two mols of fatty acid radical, from one to three mols of sulfosuccinic acid radical, and from two to four mols of diethylene glycol radical.

3. A substantially complete ester of diethylene glycol, sulfosuccinic acid, and oleic acid, containing, per mol of complete ester, two mols of oleic acid radical, from one to three mols of sulfosuccinic acid radical, and from two to four mols of diethylene glycol radical.

4. A substantially complete ester of diethylene glycol, sulfosuccinic acid, and oleic acid containing, per mol of complete ester, two molar proportions of oleic acid radical, two molar proportions of sulfosuccinic acid radical and three molar proportions of diethylene glycol radical.

5. A process for preparing a surface active agent which comprises reacting under esterification conditions, and in substantially stoichiometric proportions, from two to four molar proportions of an acyclic glycol containing from 2 to 6 carbon atoms and selected from the group consisting of alkylene and polyalkylene glycols, from one to three molar proportions of an aliphatic dicarboxylic acid containing from four to ten carbon atoms selected from the group consisting of saturated and ethylenically unsaturated acids, wherein at least 50 mol percent of the said dicarboxylic acid contains ethylenic unsaturation, and two molar proportions of a fatty acid containing from 12 to 18 carbon atoms, until esterification is substantially complete, and sulfonating the resulting polyester with sufficient aqueous bisulfite solution to furnish at least one sulfonate group per mol of said ester and at least one sulfonate group for each two dicarboxylic acid radicals in said polyester.

6. The process of claim 5 wherein esterification of the said glycol and said dicarboxylic acid is carried to substantial completion before the said fatty acid is introduced into the esterification mixture.

7. A process of preparing a surface active composition which comprises reacting under esterification conditions, and in substantially stoichiometric proportions, from two to four molar proportions of diethylene glycol, from one to three molar proportions of maleic acid, and two molar proportions of a fatty acid containing 12 to 18 carbon atoms until esterification is substantially complete, and sulfonating the resulting polyester with sufficient aqueous sodium bisulfite solution to react with at least half the maleic acid unsaturation.

References Cited in the file of this patent

UNITED STATES PATENTS

| 2,698,856 | Carnes et al. | Jan. 4, 1955 |
| 2,734,833 | Thurston | Feb. 14, 1956 |